(12) United States Patent
Goodman

(10) Patent No.: US 11,920,826 B2
(45) Date of Patent: Mar. 5, 2024

(54) EXHAUST HOOD SYSTEM WITH FLUID WALL AIR FILTER

(71) Applicant: Green Logic, LLC, Takoma Park, MD (US)

(72) Inventor: Ronald N. Goodman, Rockville, MD (US)

(73) Assignee: GREEN LOGIC, LLC, Takoma Park, MD (US)

( * ) Notice: Subject to any disclaimer, the term of this patent is extended or adjusted under 35 U.S.C. 154(b) by 186 days.

(21) Appl. No.: 17/316,212

(22) Filed: May 10, 2021

(65) Prior Publication Data

US 2021/0348780 A1 Nov. 11, 2021

Related U.S. Application Data

(60) Provisional application No. 63/021,749, filed on May 8, 2020.

(51) Int. Cl.
| | | |
|---|---|---|
| *F24F 7/003* | (2021.01) | |
| *F24F 5/00* | (2006.01) | |
| *F24F 7/00* | (2021.01) | |
| *F24F 7/007* | (2006.01) | |
| *F24F 7/08* | (2006.01) | |

(Continued)

(52) U.S. Cl.
CPC ............ *F24F 7/003* (2021.01); *F24F 5/0017* (2013.01); *F24F 7/007* (2013.01); *F24F 7/08* (2013.01); *F24F 13/00* (2013.01); *F24F 2007/001* (2013.01); *F24F 2007/002* (2013.01); *F24F 2011/0006* (2013.01); *F24F 2221/56* (2013.01)

(58) Field of Classification Search
CPC .......... F24F 7/003; F24F 5/0017; F24F 7/007; F24F 7/08; F24F 13/00; F24F 2007/001; F24F 2007/002; F24F 2011/0006; F24F 2221/56; F24F 8/117; F24F 8/175; F24F 8/22; F24F 7/06; Y02A 50/20; B08B 15/02; F24C 15/2057; Y02E 60/14
See application file for complete search history.

(56) References Cited

U.S. PATENT DOCUMENTS

| | | |
|---|---|---|
| 4,363,642 A | 12/1982 | Stahl |
| 9,010,019 B2 | 4/2015 | Mittelmark |
| 2021/0348780 A1 | 11/2021 | Goodman |

FOREIGN PATENT DOCUMENTS

| | | |
|---|---|---|
| CN | 205579697 | 9/2016 |
| CN | 205850496 | 1/2017 |

(Continued)

OTHER PUBLICATIONS

International Searching Authority and Written Opinion issued in corresponding PCT Application No. PCT/US2021/031580 dated Aug. 5, 2021.

*Primary Examiner* — Jessica Yuen
(74) *Attorney, Agent, or Firm* — WARNER NORCROSS + JUDD, LLP

(57) ABSTRACT

An exhaust hood system can include an intake located within a building, an output, a duct positioned between the intake and the output, the duct fluidly connecting the intake and the output together, a filter positioned within the duct, the filter emitting a liquid within a portion of the duct, a drain in fluid communication with the filter, and a chamber comprising a photosynthetic agent or a fungal agent. The chamber can be in fluid communication with the drain.

2 Claims, 2 Drawing Sheets

(51) Int. Cl.
*F24F 11/00* (2018.01)
*F24F 13/00* (2006.01)

(56) References Cited

FOREIGN PATENT DOCUMENTS

| | | | | |
|---|---|---|---|---|
| CN | 109595730 | A | 4/2019 | |
| JP | 2010071492 | A | 4/2010 | |
| KR | 20100134994 | | 12/2010 | |
| SE | 1651643 | A1 * | 7/2018 | ............... F24C 15/20 |
| WO | WO-9313881 | A1 * | 7/1993 | ............... F24C 15/20 |
| WO | 2021226586 | A1 | 11/2021 | |

\* cited by examiner

EXHAUST HOOD SYSTEM WITH FLUID WALL AIR FILTER

CROSS-REFERENCE TO RELATED APPLICATIONS

This application claims priority to U.S. Patent Application Ser. No. 63/021,749 filed May 8, 2020, and entitled, "Exhaust Hood System with Fluid Wall Air Filter," which is hereby incorporated by reference in its entirety.

STATEMENT REGARDING FEDERALLY SPONSORED RESEARCH

Not Applicable.

BACKGROUND

Exhaust hood systems are typically used to vent fluid (e.g., air) from an interior space and to an exterior space (e.g., the environment). To accomplish this goal, exhaust hood systems can include a duct system having an intake portion and an exhaust portion. In many instances, the intake portion is located in close proximity to a source that generates heat, exhaust, fumes, etc. (e.g., a cooking surface), while the exhaust portion empties at a location that is, for instance, outside of the structure.

However, some exhaust hood systems are inefficient, expensive, bulky, and damaging to the environment (e.g., environmentally unfriendly). Thus, it would be desirable to have improved systems and methods for exhaust hood systems.

SUMMARY OF THE DISCLOSURE

Certain embodiments of the present disclosure substantially overcome the aforementioned drawbacks by providing a novel and non-obvious multipurpose green exhaust hood system.

Some embodiments of the disclosure provide an exhaust hood system. The exhaust hood system can include an intake located within a building, an output, a duct positioned between the intake and the output, the duct fluidly connecting the intake and the output together, a filter positioned within the duct, the filter emitting a liquid within a portion of the duct, a drain in fluid communication with the filter, and a chamber comprising a photosynthetic agent or a fungal agent. The chamber can be in fluid communication with the drain.

In some embodiments, the filter can include a nozzle. The nozzle can be configured to produce at least one of a waterfall, a curtain of water, a mist, or a spray.

In some embodiments, the portion of the duct defines a cross-section. The nozzle of the filter can be configured to produce a curtain of water. The curtain of water can span substantially the entire cross-section of the portion of the duct.

In some embodiments, a flow path is defined from the intake and to the output. The exhaust hood system can include a fan positioned within the flow path. The fan can be configured to drive fluid flow along the flow path. The fan can be positioned within the duct downstream of the filter. The fan can be positioned outside of the building.

In some embodiments, the duct can include a vertical intake portion, a horizontal portion, and a vertical exhaust portion. The vertical intake portion can transition to the horizontal portion. The horizontal portion can transition to the vertical exhaust portion. The filter can be located within the horizontal portion between the vertical intake portion and the vertical exhaust portion of the duct.

In some embodiments, a portion of the horizontal portion of the duct curves downwardly or is angled downwardly relative to the vertical intake portion.

In some embodiments, the drain is located below the filter. The exhaust hood system can include a drain line in fluid communication with the drain, a valve in fluid communication with the drain line, a vertical line in fluid communication with the valve and the chamber, a recirculation line in fluid communication with the valve, the recirculation line being in fluid communication with the filter, and a pump in fluid communication with the recirculation line and the valve. The pump can direct liquid from the valve, through the recirculation line, and to the filter.

In some embodiments, the exhaust hood system can include a horizontal line in fluid communication with the valve. The horizontal line can be in fluid communication with the chamber.

In some embodiments, the chamber can be coupled to the building and can define a longitudinal dimension and a transverse dimension. The chamber and the output of the duct can be positioned outside of the building, and the longitudinal dimension can extend along a plane that is perpendicular with the height of the building. The chamber and the output of the duct can be positioned inside of the building, and the longitudinal dimension can extend along the height of the building.

In some embodiments, the chamber is a first chamber. The exhaust hood system can include a second chamber in fluid communication with the first chamber. The second chamber can be positioned above the first chamber. The photosynthetic agent can include a plant. Roots of the plant can be positioned in the first chamber. Leaves of the plant can be positioned in the second chamber.

In some embodiments, the exhaust hood system can include an energy harvesting system. The energy harvesting system can include a power source, and a capacitor electrically connected to the power source. The energy harvesting system can include an electric turbine in electrical communication with the power source, a thermoelectric generator in electrical communication with the power source, or a vibration powered generator in electrical communication with the power source.

Some embodiments of the disclosure provide an exhaust hood system. The exhaust hood system can include an intake located within a building, an output located outside of the building, a duct connected between the intake and the output, the duct fluidly connecting the intake and the output together. The duct can include a vertical intake portion positioned within the building, a vertical exhaust portion positioned outside of the building, and a horizontal portion positioned between the vertical intake portion and the vertical exhaust portion. The exhaust hood system can include a filter positioned within the duct between the intake and the output, the filter emitting a liquid within a portion of the duct, a drain in fluid communication with the filter, a drain line in fluid communication with the drain, a valve in fluid communication with the drain line, and a recirculation line in fluid communication with the valve, the recirculation line in fluid communication with the filter, and a pump in fluid communication with the valve and the recirculation line. The pump can direct fluid from the valve, through the recirculation line, and to the filter to emit the liquid.

In some embodiments, the exhaust hood system can include a chamber in fluid communication with the drain.

The chamber can include a photosynthetic agent, or a fungal agent. The exhaust hood system can include a vertical line in fluid communication with the valve and the chamber. The vertical line can be configured to deliver a fluid, collected from the drain, to the chamber. The exhaust hood system can include a horizontal line in fluid communication with the valve and the chamber. The horizontal line can be configured to deliver a fluid, collected from the drain, to the chamber.

In some embodiments, the intake is positioned above a heat source. The heat source can be cooking equipment.

In some embodiments, the exhaust hood system can include an energy harvesting system. The energy harvesting system can include a power source, an electric turbine in electrical communication with the power source, and a thermoelectric generator in electrical communication with the power source.

In some embodiments, the exhaust hood system can include a chamber in fluid communication with the drain. The chamber can include a photosynthetic agent or a fungal agent. A flow path can be defined from the intake and to the output. A portion of the vertical exhaust portion of the duct can be coupled to the chamber. The cross-section of the portion of the vertical exhaust portion of the duct that is coupled to the chamber can increase along the flow path. The cross-section of the chamber can be larger than a cross-section of the vertical intake portion of the duct.

In some embodiments, the exhaust hood system can include a fan being configured to drive fluid flow along the flow path. The electric turbine can be positioned outside of the building and within the vertical exhaust portion of the duct. The thermoelectric generator can be positioned inside of the building and within at least one of the vertical intake portion, or the horizontal portion of the duct.

In some embodiments, a portion of the duct defines a cross-section. A nozzle of the filter can be configured to produce a curtain of water. The curtain of water can span substantially the entire cross-section of the portion of the duct.

Some embodiments of the disclosure provide an exhaust hood system. The exhaust hood system can include an intake located within a building and configured to be positioned above a heat source. The heat source can include cooking equipment. The exhaust hood system can include an output located outside of the building, a duct connected between the intake and the output, the duct fluidly connecting the intake and the output together, a filter positioned within the duct, and an energy harvesting system positioned within the duct. The energy harvesting system can be configured to at least one of slow the speed of air flow through the duct thereby generating electrical energy, or cool the air as that flows through the duct thereby generating electrical energy.

In some embodiments, the energy harvesting system can include a power source electrically connected to a capacitor, and an electric turbine in electrical communication with the power source. The electric turbine can be positioned outside of the building. The energy harvesting system can include a thermoelectric generator in electrical communication with the power source. The thermoelectric generator can be located within the building. The energy harvesting system can include a vibration powered generator in electrical communication with the power source. The vibration powered generator can be located outside or inside of the building and adjacent to a fan that drives fluid flow along a flow path from the intake and to the output. The filter can include a nozzle that delivers liquid within the duct that is at least one of a waterfall, a curtain of water, a mist, or a spray.

The foregoing and other aspects and advantages of the present invention will appear from the following description.

BRIEF DESCRIPTIONS FOR THE DRAWINGS

In order to assist the understanding of this invention, reference will now be made to the appended drawings, in which like reference characters refer to like elements. The drawings are exemplary only, and should not be construed as limiting the invention.

DETAILED DESCRIPTION

Figure 1:
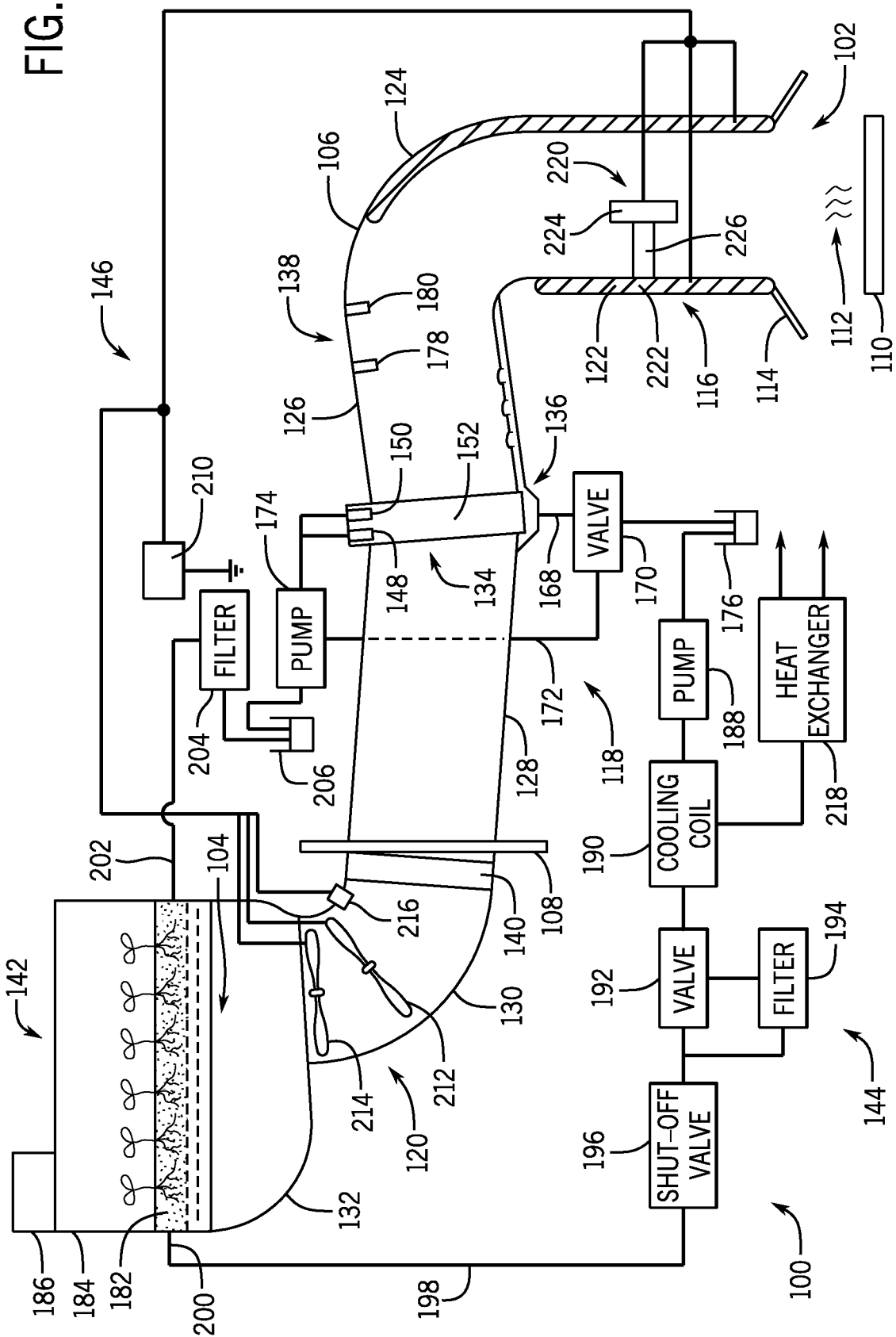
FIG. 1 shows a schematic diagram of an exhaust hood system according to an embodiment of the present disclosure.

Some conventional exhaust hood systems are used solely for venting air from the interior of a structure (e.g., a building) to the exterior of the structure (e.g., the building), such as to the ambient environment. Often, regulations require that the output of the exhaust hood system be situated near the top of the building. Thus, in some cases, such as when the intake is situated on the lowest floor of the building (e.g., the restaurant), these exhaust hood systems must traverse the entire height of the building, which can require lengthy ducts. While this can comply with regulations, these exhaust hood systems with lengthy ducts (that traverse nearly or the entire height of the building) can be quite expensive.

Some alternative approaches have aimed to decrease the length of ducts of exhaust hood systems to save costs (and to improve building ascetics). However, in these configurations, while the length of the duct can be decreased, if this is implemented, regulations require building owners to scrub the fluid (e.g., within the exhaust hood system) prior to being emitted into the environment. For example, some conventional scrubbing systems include a massive cylinder having large banks of various filter media housed therein, which requires constant detergent flow (typically not environmentally friendly) to clean the air prior to being emitted into the ambient environment. These scrubbing systems, while providing adequate cleaning of the air, are energy intensive, expensive, and bulky (e.g., taking up a lot of space). Thus, there is a need in the art for a multipurpose exhaust hood system that can contribute to the health of the environment. In other words, a "green" exhaust hood system, or a "green" multipurpose exhaust hood system would be desirable.

Some embodiments of the disclosure provide advantages to these issues (and others) by providing improved systems and methods for exhaust hoods. For example, some embodiments of the disclosure provide an exhaust hood system including a duct having an intake situated at one end and an output (e.g., an outtake, or in other words an exhaust) situated at an opposing end. In some cases, the intake can be situated above a heat source, such as cooking equipment (e.g., stoves, ovens, fryers, etc.), so that hot (and relatively dirty air) is directed through the intake to flow along the duct and directed out at the output. In some embodiments, the intake can be situated within a structure (e.g., a building), and the output can be situated outside of the building. In this way, air that is directed through the duct can be passed through the output and into the environment (e.g., outside).

In some configurations, the exhaust hood system can include a filter that is positioned within the duct, and which is configured to emit a liquid within a portion of the duct. For example, the filter can include a nozzle that receives a liquid to produce a waterfall, a curtain of water, a mist, a spray, etc.

Regardless of the configuration, the filter that emits the liquid provides advantages to the previous configurations. First, as the dirty air flows through the filter, dust, particulates, hydrophilic compounds, hydrophobic compounds (e.g., if the liquid includes a surfactant, or an emulsifier), and carbon dioxide are trapped within the liquid, thereby filtering the dirty air. Thus, the filter cleans the dirty air, thereby producing cleaner air downstream of the filter. Second, as the dirty air flows through the filter, the liquid (e.g., water) absorbs heat from the dirty air thereby cooling the dirty air. In this way, the cleaning of the air by the filter can remove the need for expensive, energy intensive scrubbing systems (including expensive scrubbing agents). In addition, cooling of the dirty air by the filter can advantageously reduce the length of the duct. For example, in order to properly cool the air before emission into the environment, relatively long ducts are needed, which requires substantial additional costs (e.g., due to additional costs for duct materials (e.g., double and triple wall duct), increased installation costs, such as welding of each joint, etc.).

FIG. 1 shows a schematic illustration of an exhaust hood system 100, which can be situated inside a structure (e.g., a building) and outside the structure. The exhaust hood system 100 can include an intake 102, an output 104, and a duct 106 connected between the intake 102 and the output 104. In some cases, the duct 106 defines the intake 102 and the output 104, while in other cases, one end of the duct 106 is coupled to the intake 102 and an opposing end of the duct 106 is coupled to the output 104. In some configurations, the duct 106 fluidly connects the intake 102 and the output 104 together so that a flow path is defined from the intake and to (and through) the output 104. As shown in FIG. 1, the intake 102 can be positioned within a structure 108 (e.g., a building), while the output 104 can be positioned outside of the structure 108. The intake 102 can be positioned above a heat source 110, which provides heated air to (and through) the intake 102. For example, the heat source 110 (e.g., cooking equipment, such as stoves, ovens, fryers, exhaust sources such as engines, fume sources, etc.) can produce dirty heated air 112, which is vented though the duct 106 and thereby prevented from being recirculated within the structure 108. In some cases, rather than a heat source 110 the intake 102 can be situated proximal to (e.g., above) a fume source, and exhaust source, etc. While the intake 102 is illustrated as having a hood 114 that decreases in cross-section along the flow path, in other configurations the intake 102 can have a uniform cross-section along the flow path. Similarly, while the output 104 is illustrated as having a cross-section that increases along the flow path, in other configurations, the output 104 can have a uniform cross-section along the flow path.

The duct 106 can include sections 116, 118, 120, with the section 118 being positioned between the sections 116, 120. The section 116 includes a vertical portion 122, and a curved portion 124 that is joined to and positioned above the vertical portion 122. The vertical portion 122 can define a vertical intake portion as it is the first portion of the duct 106 (aside from the intake 102) to receive the dirty heated air 112. In some cases, the vertical portion 122 can include the intake 102. The curved portion 124 is situated between the vertical portion 122 and the section 118, and has an arc length that can sweep various angles. For example, as illustrated in FIG. 1, the arc length of the curved portion 124 sweeps an angle of about (e.g., deviating by less than 20%) 90 degrees. However, in other configurations, the arc length of the curved portion 124 can sweep other angles, such as about 180 degrees. In this case, the curved portion 124 has a u-shape, which can be advantageous in that the u-shape can trap gasses (and liquids) and thereby prevent backflow through the intake 102. As shown in FIG. 1, the section 118 of the duct 106 includes portions 126, 128. The portion 126 can be angled relative to a horizontal axis (e.g., that extends left to right relative to the view of FIG. 1). In particular, the portion 126 can be downwardly angled relative to the horizontal axis and to an uppermost vertical end of the section 116 (e.g., an end of the curved portion 124 that is coupled to an end of the portion 126). In some cases, this downward angle can be in a range between about 0.1 to 10 degrees. In other cases, rather than being downwardly angled, the portion 126 of the duct 106 can be curved downwardly relative to the horizontal axis and the uppermost vertical end of the section 116. Regardless of the configuration of the portion 126, a section of the portion 126 of the duct 106 can be positioned below a portion of the section 118. In this way, liquid advantageously (whether condensed or produced from another source) flows down the portion 126 to be collected rather than flowing back through the intake 102. As shown in FIG. 1, the portion 128, which is positioned downstream from the portion 124, extends upwardly relative to the portion 126. For example, the portion 128 can be angled upwardly relative to the horizontal axis and the portion 126. As another example, and similarly to the portion 126, the portion 128 can be curved upwardly relative to the horizontal axis and the portion 126. Again, regardless of the configuration, the upward angling of portion 128 allows liquid to flow down the portion 128 to be collected. In some configurations, the portions 126, 128 can collectively define a u-shape.

As shown in FIG. 1, the section 116 can define a vertex, which can be the lowest point between the downwardly angled portion 126, and the upwardly angled portion 128. In some cases, the section 116 can have a local minima (e.g., a single local minima) that is the lowest point for the section 116 (e.g., regardless of whether portions are curved, angled, etc.). In this way, liquid can naturally collect at the local minima. In some embodiments, the section 118 or the individual portions 126, 128 can each be considered as a horizontal portion of the duct 106 at least because these features of the duct 106 can extend substantially horizontally. In addition, while the section 116 (and thus the portions 126, 128) are illustrated in FIG. 1 as being located within the structure 108, in alternative configurations, different portions of the section can be located outside the structure 108 (as appropriate).

In some embodiments, the section 120 can be positioned outside of the structure 108 and can include portions 130, 132. As shown in FIG. 1, the portion 130 curves upwardly relative to the horizontal axis and the section 118, however, in other configurations, the portion 130 can extend upwardly (e.g., being angled rather than curved) relative to the horizontal axis and the section 118. In some embodiments, the portion 132 is positioned downstream of the portion 130 and can have an increasing cross-section along the flow path. In other configurations, however, the portion 132 can have a uniform cross-section. As illustrated in FIG. 1, the portion 132 can have a larger cross section than the portion 130. In this way, the flow rate of fluid (e.g., along the flow path) within the portion 132 can be lower than the flow rate of fluid (e.g., along the flow path) within the portion 130 (e.g., due to the increase volume within the portion 132 rather than the portion 130), which is desirable at least because the flow rate emitted from the output must be below a threshold regulatory value. In some embodiments, the portion 132 of the duct 106 can include a diffuser that regulates the air that passes through the output 104 (and thus reaches the chamber 182).

The exhaust hood system 100 can also include a filter 134, a drain 136, a cleaning system 138, a fan 140, a structure 142 containing a living material (e.g., a living wall/floor), an irrigation system 144, and an energy harvesting system 146. The filter 134 can be positioned within the duct 106, and can be configured to emit a liquid within a portion of the duct 106. For example, the filter 134 can be positioned within the horizontal section 118 of the duct 106. In particular, the filter 134 can be positioned at the local minima of the horizontal section 118. In other words, the filter 134 can span past the local minima (e.g., in both the downstream and upstream directions). In some embodiments, the filter 134 can be defined as a fluid wall air filter. The filter 134 can include a nozzles 148, 150 each of which is configured to receive liquid to produce a waterfall, a curtain of water, a mist, or a spray. For example, as shown in FIG. 1, the nozzles 148, 150 are coupled to a housing 152 of the filter 134 so that the nozzles 148, 150 each emit a liquid downwardly. In some cases, the nozzles 148, 150 can each be coupled to the duct 106 and positioned outside of the duct 106, with a portion of each nozzle 148, 150 being inserted through a hole of the duct 106. In some configurations, the housing 152 of the filter 134 can be positioned within the duct 106, while in other configurations, the section 118 of the duct 106 (or a different portion of the duct 106) can be split in two so that the filter 134 can be sandwiched between the split ends. In some embodiments, a nozzle (or multiple nozzles, such as the nozzles 148, 150) of the filter 134 can be situated between opposing ends of the housing 152 of the filter 134, with one end positioned upstream of the nozzle, and with one end positioned downstream of the nozzle. In some configurations, each end of the housing 152 can be perforated, or in other words can have holes directed therethrough. In this way, the liquid from the filter 134 can be largely retained within opposing ends of the housing 152, while the air flowing along the duct 106 can readily flow through the opposing ends of the housing 152.

In some configurations, and as shown, the nozzles 148, 150 are positioned along the flow path, so that the nozzles 148, 150 are separated from each other along the flow path. In other configurations, the nozzles 148, 150 can be positioned at the same location along the flow path of the duct 106. In some configurations, the liquid (e.g., water) emitted from each nozzles 148, 150 can span the entire cross-section of the housing 152 of the filter 134. In this way, most of the dirty heated air 112 that flows along the flow path is forced through at least some of the liquid emitted by each nozzle 148, 150. FIG. 2A shows a cross-sectional view of another filter 154 that can be replaced with the filter 134 (or can be used in addition to the filter 134). The filter 154 can be positioned within the duct 106 (e.g., the horizontal section 118 of the duct 106) and can include a nozzle 156 that produces a curtain of water 158. The curtain of water 158 can have various thicknesses and densities (e.g., as appropriate to allow air flow through), and spans about the entire cross-section of the duct 106 at the location of the nozzle 156. In this way, similarly to the filter 134, most (if not all) of the dirty heated air 112 is forced through the curtain of water 158 thereby cleaning the dirty heated air 112. In some embodiments, the curtain of water 158 can extend substantially perpendicularly relative to the flow path of the duct 106, however, in alternative configurations the curtain of water 158 can be angled relative to flow path of the duct 106 and toward the intake 102. In some configurations, while the nozzle 156 is illustrated as spanning about the entire width of the duct 106 at this location, in other configurations, multiple nozzles can be used instead of the single nozzle 156 to produce multiple curtains of water that collectively span about the entire cross-sectional area of the duct 106 at that location.

Figure 2B:
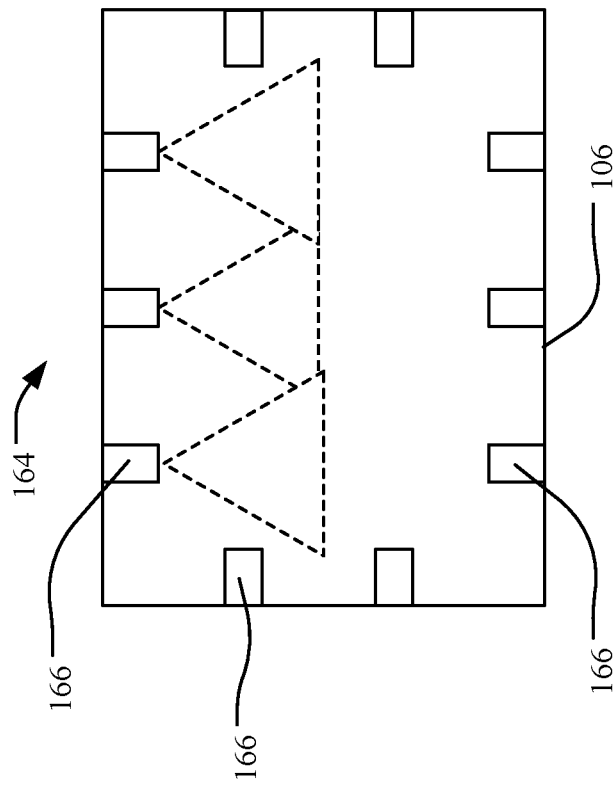
FIG. 2B shows a cross-sectional view of another filter that can be replaced with the filter of FIG. 1.
Figure 2A:
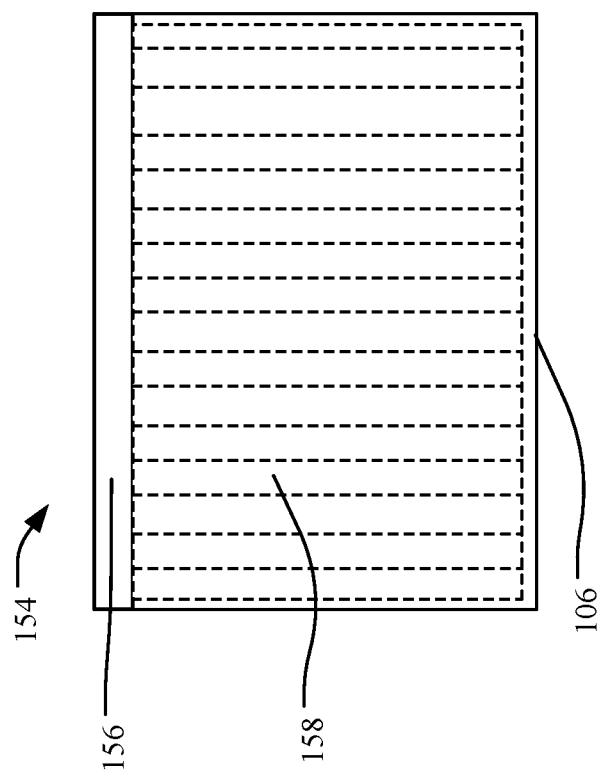
FIG. 2A shows a cross-sectional view of another filter that can be replaced with the filter of FIG. 1.

FIG. 2B shows a cross-sectional view of another filter 164 that can be replaced with the filter 134 (or can be used in addition to the filter 134). The filter 164 can be positioned within the duct 106 (e.g., the horizontal section 118 of the duct 106) and can include a plurality of nozzles 166, each of which receiving and emitting a liquid. As shown in FIG. 2B, each side of the duct 106 can include a nozzle. For example, a lower side of the duct 106 includes a nozzle (e.g., three nozzles illustrated), an upper side of the duct 106 includes a nozzle (e.g., three nozzles illustrated), and a first lateral side of the duct 106 adjacent to both the lower and upper sides of the duct 106 includes a nozzle (e.g., two nozzles illustrated), and a second lateral side of the duct 106 opposite the first lateral side includes a nozzle (e.g., two nozzles illustrated). In this way, with each nozzle emitting a liquid (e.g., illustrated as a spray in FIG. 2B), most (if not all) of the dirty heated air 112 is forced through the liquid thereby cleaning the liquid. In some configurations, while all of the nozzles 166 are illustrated as producing a spray, in other configurations, the each nozzle 166 can produce a different liquid emission (with some producing a similar liquid emission), such as a curtain of water, a mist, a waterfall, a spray, etc. Similarly, while all the nozzles 166 are positioned at the same location along the flow path of the duct 106 so that all the nozzles 166 are aligned with each other along a plane (e.g., the plane shown in FIG. 2B), the some of the nozzles 166 can be staggered along the flow path of the duct 106.

Referring back to FIG. 1, regardless of the configuration of the filter 134, as the dirty heated air 112 flows through the liquid produced by the filter 134, dust, particulates, hydrophilic compounds, hydrophobic compounds (e.g., if the liquid includes a surfactant, or an emulsifier), and carbon dioxide are trapped within the liquid, thereby filtering the dirty heated air 112. Simultaneously, as the dirty heated air 112 flows through the liquid produced by the filter 134, the dirty heated air 112 is cooled. In this way, the air flowing downstream through the duct 106 past the filter 134 is cleaner and cooler (e.g., than the air upstream of the filter 134). In some embodiments, with the filter 134 capturing (and dissolving) hydrophobic compounds (e.g., via emulsifiers, or surfactants), there is a decreased likelihood (or amount) of hydrophobic deposited materials within the duct 106 (e.g., from cooking oils). Thus, with less deposited hydrophobic materials, and with cooler air flowing through the duct 106 (e.g., from the filter 134 or energy harvesting devices), there is a decreased likelihood for spontaneously creating a fire within the duct 106

In some embodiments, regardless of whether the surfactant (or emulsifier) is present in the liquid produced by the filter 134, the liquid emitted from the filter (and the liquid emitted by the cleaning system 138) can force some of the vaporized fat (e.g., or other hydrophobic molecules) into the drain 136. For example, the liquid emitted from the filter 134 can include a biodegradable emulsifier or surfactant (e.g., a food based emulsifier or surfactant), which can capture hydrophobic compounds and direct them into the drain 136. As another example, the liquid emitted from the cleaning system 138 can include a plant based cleaner (e.g., an orange rind based cleaner, other plant based cleaners, etc., that do not harm the living material within the structure 142), which can capture and direct hydrophobic compounds into the drain 136, and can scrub hydrophobic deposits off of the surface of the duct 106 to be directed and captured into the drain 136. In some cases, a user can spray the plant based cleaner (or other cleaner) onto the inner surface of the duct 106 to also scrub the hydrophobic material deposits within the duct 106.

In some embodiments, the reservoir 176 can include a skimmer (e.g., a grease skimmer, a vacuum pump with an inlet in contact with an upper surface of the liquid positioned within the reservoir 176) that is configured to siphon off hydrophobic compounds (e.g., fats) collected by the drain 136. Thus, because the hydrophobic compounds (e.g. fats) rise to the surface of the liquid (e.g., due to the specific gravity of the hydrophobic compounds, inability to dissolve in the liquid, etc.), the skimmer can draw the hydrophobic compounds off the surface of the liquid thereby removing at least some hydrophobic compounds from the liquid. In some embodiments, the skimmer can be electrically powered (e.g., by the power source 210), and the skimmer can float on the liquid within the reservoir 176. In some embodiments, rather than being positioned within the reservoir 176, the skimmer can be positioned within the drain 136 (or a different reservoir in fluid communication with the drain 136, such as a reservoir coupled to the drain 136) so that hydrophobic compounds can be removed from the liquid that is recirculated by the pump 174. In some cases, regardless of the configuration, the skimmer can collect and direct hydrophobic compounds into a hydrophobic compound reservoir. In this way, the collected hydrophobic compounds (e.g., grease, fats, etc.) can be removed from the reservoir to be recycled (e.g., turned into biofuel). In some embodiments, with the inclusion of the filter 134, moisture can be added to the air as it flows along the duct 106 thereby further decreasing the likelihood of flare ups within the duct 106.

In some embodiments, the liquid can be a hydrophilic solvent (e.g., water) and can include dissolved compounds. In some cases, the dissolved compounds can be salts, surfactants (e.g., that can be biodegradable), emulsifiers (e.g., that can be biodegradable), etc. In configurations, the liquid can be liquid growth media for photosynthetic organisms (e.g., plants), or beneficial fungi and/or bacteria, which can include nutrients needed for their proper growth, such as, for example, dissolved phosphorous, dissolved nitrogen, dissolved potassium, dissolved sodium, etc. In some embodiments, the filter 134 can include an ultraviolet light ("UV") source, which can disinfect pathogens (or other undesirable microorganisms). In some embodiments, the UV source can be powered by a power source (e.g., the power source 210).

In some embodiments, the exhaust hood system 100 can include an additional filter. This filter can be positioned within the duct 106 and can be a non-flammable carbon-based filter. In some embodiments, the exhaust hood system 100 can include an additional filter that is structured similar to the filter 134, which can include a corresponding drain. In some embodiments, the exhaust hood system 100 can include an additional filter positioned near the intake 102. For example, this filter can be a standard or textured metal hood filter (e.g., a stainless steel).

The drain 136 is in fluid communication with the liquid produced by the filter 134, so that the drain 136 can direct and collect liquid produced by the filter 134. In some cases, the drain 136 can be external to the duct 106, can be positioned within the duct 106, can be external to the duct 106, or can be internal to the duct 106. In some configurations, the drain 136 can be part of the filter 134. For example, the drain 136 can be positioned within the housing 152 of the filter 134. In some cases, the drain 136 can be positioned at the local minima of the horizontal section 118 of the duct 106 so that liquid (e.g., either emitted by the filter 134, or condensed) can travel freely (e.g., by gravity) down both portions 126, 128 to the drain 136. In some configurations, the drain 136 can be positioned below a nozzle of the filter 134 and can have opposing portions, with one portion extending upstream and an opposing portion extending downstream. Each portion can be curved or angled upwardly to facilitate the movement of the liquid against the flow path to the drain 136, and along the flow path to the drain 136. In some configurators, such as when the drain is positioned outside of the duct 106, the duct can include holes (e.g., weep holes) that facilitate movement of the liquid from inside the duct 106 and outside of the duct 106 and to the drain 136.

As shown in FIG. 1, a drain line 168 is in fluid communication with the drain 136, and is in fluid communication with a valve 170. For example, the drain line 168 can be positioned between the drain 136 and the valve 170. In addition, a recirculation line 172 is in fluid communication with the valve 170 and the filter 134. In some configurations, the valve 170 can be a three-way valve, a bypass valve, etc. In some embodiments, as liquid is collected by the drain 136, the liquid flows through the drain line 168, and can flow through the recirculation line 172 (e.g., with the valve 170 being in a first position). After the liquid flows through the recirculation line 172 (e.g., via a pump 174, which can be an electrical pump), the liquid can be emitted again through the nozzles 148, 150. Thus, the recirculation line 172 can be in fluid communication with each of the nozzles 148, 150. In this way, liquid produced by the filter 134 can be recirculated to be emitted again by the filter 134 (and so on).

In some configurations, and as shown in FIG. 1, liquid flowing through the drain line 168 can flow through the valve 170 (e.g., when the valve 170 is in a second position) and can be directed into a reservoir 176 of the irrigation system 144. Thus, the reservoir 176 can be in fluid communication with the valve 170. The liquid within the reservoir 176 can be used by the irrigation system 144, which will be described in more detail below.

In some embodiments, the exhaust hood system 100 can also include the cleaning system 138. The cleaning system 138 can be located within the duct 106, and can be positioned upstream of the filter 134. In some configurations, the cleaning system 138 can be configured to emit a liquid towards an interior surface of the duct 106. For example, the cleaning system 138 can include nozzles 178, 180, which are staggered along the flow path of the duct 106 (e.g., to flush out the duct 106 when desired). The nozzles 178, 180 are illustrated as each directing a liquid at the lower interior surface of the duct 106, and in particular the lower interior surface of the portion 126 of the duct 106. However, in alternative configurations, each nozzle of the cleaning system 138 can be directed at a respective side of the duct 106 (e.g., similarly to the configuration of the filter of FIG. 2B). The liquid (e.g., water, a cleaning solution that can be biodegradable, etc.) emitted from the cleaning system 138 is directed at the surface of the duct 106 to direct the dirty water from the filter 134 to collect in the drain 136 (e.g., prevent backflow of the dirty water), and can facilitate movement of condensed liquid into the drain 136 (e.g., to flush out the duct 106). In some cases, the liquid provided to the cleaning system 138 can be from a different liquid source.

In some embodiments, the exhaust hood system 100 can include the fan 140. The fan 140 can be positioned within the flow path of the duct 106, and can be configured to drive fluid flow along the flow path. For example, with the fan 140 on (e.g., rotating), the fan 140 draws fluid from the intake 102, along the duct 106, to the output 104, and through the output 104. In some cases, the fan 140 can be electrically powered, and can be controlled by a computing device. As shown in FIG. 1, the fan 140 is positioned within the duct 106 downstream of the filter 134, and outside of the structure 108, however, the fan 140 can be positioned at other location within the duct 106. In alternative configurations, rather than the fan 140, the exhaust hood system 100 can include a suction source (e.g., a pump) that draws fluid through the intake 102 and out the output 104. In some embodiments, the fan 140 can be positioned between the filter 134 and the structure 142. In some configurations, the fan 140 can be positioned between the output 104 and the structure 142.

In some embodiments, the exhaust hood system 100 can include a structure 142 that can include a living material. In some embodiments, the structure 142 can include a photosynthetic agent, such as, for example, a plant, algae, a photosynthesizing bacteria, and/or beneficial fungi or bacteria, etc. The structure 142 can be coupled to the output 104 of the duct 106, and can be in fluid communication with the duct 106. As shown in FIG. 1, the structure 142 can be sealed with the duct 106 so that air emitted at the output 104 is forced into the structure 142. In some cases, the structure 142 can be entirely sealed with the output 104 (e.g., little to no air escaping into the environment), while in other cases, the structure 142 can be partially sealed with the output 104 (e.g., so that a portion of the output 104 is sealed by the structure 142 and a portion of the output 104 is exposed to the environment). The structure 142 can include chambers 182, 184, which can both be in fluid communication with each other. In some embodiments, the structure 142 can have a hole directed therethrough, which can be smaller than the cross-section of the portion 130 (e.g., being the same size or substantially the same size). In this way, a portion of the air flow through the portion 130 is emitted into the environment, and another portion of the air flow through the portion 130 is emitted through the structure 142 (e.g., the chamber 182. In some cases, a drain (e.g., that is pitched, or in other words angled, relative to the chamber 182) can be in fluid communication with the structure 142 (e.g., the chamber 182), and correspondingly, can have a recirculation line in fluid communication with this drain and the chamber 182. In this way, a pump can direct fluid from the drain, through the recirculation line, and back into the chamber 182.

In some embodiments, the chamber 182 can be positioned below the chamber 184, and can include perforations (or in other words holes) that can provide fluid communication pathways between the duct 106 and the chamber 182. In some cases, rather than (or in addition to) the perforations, the chamber 184 can be lined with a mesh, membrane (e.g., a semi-permeable membrane), etc., that prevents (or substantially limits) liquid from escaping into the duct 106, but which allows (or substantially allows) air (e.g., gasses) through. In this way, liquid received within the chamber 182 is retained in the chamber 182, while air (e.g., gasses) that travel through the duct 106 can penetrate the chamber 182 to be received within the chamber 182. In some configurations, the photosynthetic agent can be positioned within the chamber 182. For example, such as when the photosynthetic agent is a plant (e.g., plants), dirt/soil-media, growing media (e.g., hydroponics), etc., can be situated within the chamber 182 and thus the roots of the plant can be situated within the chamber 182, and correspondingly, the leaves of the plant can be situated within the chamber 184. In some embodiments, the structure 142 can be located on a roof of a building (e.g., when the structure 108 is implemented as a building). In some embodiments, the structure 142 can be coupled to a side of the structure 108 (e.g., a building). For example, a cantilevered support can be coupled to and can extend from the building. The structure 142 can then be coupled to (e.g., situated on top of) the cantilevered support. In some embodiments, the structure 142 can be positioned within the structure 108, such as when the structure 108 is a building. In some cases, this can be advantageous in that the temperature of the ambient environment is relatively stable and is not harsh to the living components in the structure 142. In addition, the exhaust hood system 100 can include a lighting system having a number of light emitting elements (e.g., light sources, such as a light emitting diode) to emit light onto the chamber 182, which can be positioned within the structure 108. In this way, the lighting system can better control the growing conditions (e.g., the habits of the plants). In some cases, this lighting system can be powered by the energy harvesting system 146 (or the power source 210 that receives or stores power from the energy harvesting system 146).

In some embodiments, rather than the structure 142 including a photosynthetic agent, the structure 142 can facilitate the growing of other crops, such as those that do not rely on light (e.g., but rather rely on decomposition). For example, the structure 142 can include fungi crops, such as edible mushrooms (e.g., those used in cooking), etc. In this way, the structure 142 can grow other crops that need little light (e.g., fungi, including mushrooms need very little light).

In some embodiments, the structure 142 (and the chambers 182, 184) can be oriented in different ways. By way of example only, the structure 142 can have a longitudinal dimension (e.g., a length) that extends horizontally along a plane of the structure 108 (e.g., a building) that is perpendicular relative to the height of the building. In this case, as described above, the structure 142 can be defined as a horizontal living wall. In other cases, the structure 142 can be positioned so that the longitudinal dimension of the structure 142 extends vertically along the height of the structure 108 (e.g., a building, and in particular a wall of the building). In this case, the structure 142 can be coupled to the structure 108 (e.g., using fasteners or any other suitable method of attachment) on either an exterior and/or interior surface of structure 108. In this case, the structure 142 can be defined as a vertical living wall. In the case of a vertical living wall, structure 142 may or may not be in fluid communication with output 104.

In some embodiments, the structure 142 can be positioned exterior to the structure 108, or inside the structure 108. For example, and as illustrated in FIG. 1, the structure 142 can be positioned outside of the structure 108 (e.g., the building) and coupled to the structure 108 (e.g., via a cantilevered support extending from the structure 108). As another example, the structure 142 can be positioned inside of the structure 108 (e.g., the building) and can be coupled to the structure 108 (e.g., a wall of the structure 108, a floor of the structure 108). In this case, the entire duct 106 (e.g., including the output 104 of the duct 106) can be positioned within the structure 108, or output 104 may remain outside of structure 108 and not be in fluid communication with structure 142. In some cases, a wall that defines the chamber 182 can be formed out of a mesh material, or any other material providing an anchor for the photosynthetic agent. In this way, such as when the photosynthetic agents are plants, stems (and leaves) of the plants can emerge through the mesh and can be situated within the interior of the structure 108 (e.g., outside of the structure 142 including the chamber 182), while roots of the plants remain in the chamber 182 (and can be nourished by growth media therein). In some embodiments, chamber 184 may not be entirely enclosed, but have portions open to the external environment. As such, the structure 142 within a building can provide improved ascetics (e.g., having green plants) for the building (and even in some cases produce plant produce, such as greens (e.g., lettuce, or fungal produce such as mushrooms).

In some embodiments, any suitable growth medium (e.g., natural, or artificial) can be used for the photosynthetic agent (e.g., plants and mushrooms). In some cases, for example in the horizontal living wall, the photosynthetic agent and the growth media situated within the chamber 182 act as an additional air filter, further removing exhaust impurities from the air flow through the duct 106. In some cases, the photosynthetic agent and the growth media (with or without beneficial microorganisms) can also clean the liquid collected from the drain 136. For example, carbon dioxide dissolved in the liquid can be delivered to and used by the photosynthetic agent. In particular, the photosynthetic agents (e.g., plants) and growth medium (with or without beneficial microorganisms) are also beneficial in that they take in the carbon dioxide (e.g., and correspondingly sequester carbon) and some release oxygen into their surroundings. In some cases, the growth medium can be inoculated with beneficial microorganisms, including bacteria, fungi, etc., that help with the process. For example, the mycelium of fungi can provide a better biodegradable system and can work with the bacteria to create an improved "green" system. In addition, the photosynthetic agents can be nitrogen fixing. For example, such as when the photosynthetic agents are plants, the plants can be nitrogen fixing plants (e.g., legumes) that do not need an external source of nitrogen (e.g., do not need a nitrogen-based fertilizer). In some cases, the same irrigation system 144 can be connected to a fertilizer source (e.g., a fertilizer injector) such as through opening and closing a valve.

In some embodiments, in winter and any cooler season the heated exhaust from the cooking, or from any other heat source, can reduce energy demand and heating costs. During summer and warmer seasons, the filter 134 can cool the exhaust. In some cases, the liquid lines of the exhaust hood system 100 can be routed and bypass-valved through air-conditioned areas of the structure 108 (e.g., dining areas, refrigerated walk-ins, which most restaurants possess) to assist with passive cooling for the warmer months.

In some embodiments, the structure 142 can include a vent 186 that allows a particular amount of air out at a time. In some cases, the vent 186 can be a one-way valve, a flap covering a hole, etc., that allows the flow of air from the chamber 184 and out into the environment. In some cases, the vent 186 can be in fluid communication with the chambers 182, 184 and can be positioned at the top of the chamber 184. In some embodiments, the vent 186 can include a damper system to regulate air flow through the vent 186. In some configurations, the damper system can close the vent 186 when the exhaust hood system 100 is not in use.

In some embodiments, the structure 142 can be a greenhouse-like structure. For example, the structure 142 can be exposed to a light source (e.g., sunlight) and can include materials that trap the light thereby increasing the temperature of the structure 142 to a value higher than the temperature of the environment. In some cases, the structure 142 can include reflective materials (e.g., reflective panels that line the structure 142) so that the structure 142 can trap an additional portion of the light. In addition, the light provides the photosynthetic agents with light needed to consume carbon dioxide and grow. In some embodiments, the air flowing through the duct 106 can also supply warm air to the chamber 182.

In some embodiments, the exhaust hood system 100 can include the irrigation system 144, which can supply liquid (e.g., water) to the structure 142, and in particular the chamber 182 that includes the photosynthetic agent. As shown in FIG. 1, the irrigation system 144 can include the reservoir 176, a pump 188, a cooling coil 190 (or other cooling system, e.g., evaporative cooling which can include the liquid from the recirculation line 172 that could be evaporated to cool the air and condensed back into recirculation), a valve 192, a filter 194, and a shut-off valve 196, each of which can be in fluid communication with each other. The pump 188 (e.g., which can be an electrical pump), when active, draws fluid from the reservoir 176 (or other fluid source), can direct it through the cooling coil 190 to cool the liquid, and through the valve 192. In some cases, the valve 192 can direct the liquid through the shut-off valve 196 (e.g., when the valve 192 is in one position), and in other cases, the valve 192 can direct the liquid through the filter 194 before being directed through the shut-off valve 196 (e.g., when the valve 192 is in a second position). In some cases, the filter 194 can collect debris, solid particulates, etc. from the liquid. In some embodiments, the shut-off valve 196 can be manually closed and opened (e.g., with a lever) to allow or prevent fluid flow past the shut-off valve 196, while in other cases, the shut-off valve 196 can be electrically closed and opened.

In some embodiments, because parts of the irrigation system 144 can be located within the structure 108 (e.g., a building) that has a relatively stable temperature, the fluid delivered to the structure 142 can be relatively stable as well. In some embodiments, the irrigation system 144 can include a sprinkler, positioned within the structure 142, that can deliver liquid (e.g., water) to the photosynthetic agents or fungi (e.g., plants, mushrooms, etc.). In some embodiments, the irrigation system 144 can include a drain in fluid communication with the chamber 182 (e.g., situated below the chamber 182). In this case, the line 202 can be in fluid communication with the drain.

As shown in FIG. 1, a vertical line 198 is in fluid communication with the shut-off valve 196 and a horizontal line 200. The horizontal line 200 is in fluid communication with the structure 142, and in particular, the chamber 182. In this way, the drain 136 can be in fluid communication with the chamber 182 so that liquid collected from the filter 134 can be transported to the chamber 182. The vertical line 198 allows the liquid to be forced upwards to be delivered to the chamber 182. In some cases, the vertical line can be in fluid communication with the valve 170 and the chamber 182. In addition, the horizontal line 200 can be in fluid communication with the chamber 182 and the valve 170. In some embodiments, a one-way valve can be positioned at an entry port of the chamber 182 (or within the horizontal line 200). In this way, fluid is prevented from flowing back though the irrigation system 144 (e.g., back through the horizontal line 200). In some embodiments, the irrigation system 144 can include a line 202 in fluid communication with the chamber 182, a filter 204 in fluid communication with the line 202, a reservoir 206 in fluid communication with the filter 204. In some cases, a port of the chamber 182 (or the line 202) can include a one-way valve that prevents fluid from flowing in a direction that is back through the chamber 182 away from the filter 204. The filter 204 can be structured similarly to the filter 194 and thus can collect debris from the liquid passing through.

In some embodiments, the chamber 182 can be in fluid communication with the filter 134. For example, the liquid collected by the drain 136 (from the filter 134) can be circulated through the chamber 182, and can be directed back through the filter 134 again (e.g., through the nozzles 148, 150), and so on.

As shown in FIG. 1, the exhaust hood system 100 can also include an energy harvesting system 146. The energy harvesting system 146 can include a power source 210, turbines 212, 214, a vibration powered generator 216, a heat exchanger 218, and a thermoelectric generator 220. The power source 210 can be implemented in different ways. For example, the power source 210 can be an energy storage device (e.g., a battery, a battery system with a capacitor, etc.), an electric grid (e.g., a transmission substation), power lines (e.g., directed back to the electric grid), etc. As another example, the power source 210 can be a capacitor-battery-system. For example, energy generated by the energy harvesting system 146 can be stored by the power source 210, or can be delivered to the power source 210. In some cases, the power source 210 can include other power components, such as voltage regulators, inverters, rectifiers, transformers, capacitors, etc., to appropriately deliver electrical energy to or store electrical energy within the power source 210. In some configurations, the power source 210 can provide energy to some or all of the components of the exhaust hood system 100. For example, the power source 210 can power the valves, pumps, fans, cooling coils, etc.

In some embodiments, the energy harvesting system 146 can include the turbines 212, 214. Each of the turbines 212, 214 can be positioned within the duct 106 (e.g., the section 120 of the duct 106), and can be positioned downstream of the fan 140. In addition, the turbines 212, 214 can be positioned outside of the structure 108 and can be coupled to the duct 106. Each of the turbines 212, 214 can include an electrical generator (e.g., having electric coils, magnets or electromagnets, etc.) that convert the kinetic energy (e.g., rotation of the blades) of the air through the duct 106 into electrical energy that is provided to the power source 210. Thus, as shown in FIG. 1, each of the turbines 212, 214 can be in electrical communication with the power source 210. In some embodiments, the energy harvesting system 146 can have a single turbine (e.g., the turbine 212), or can include multiple turbines. For example, the energy harvesting system 146 can include an array of turbines, each of which include an electrical generator in electrical communication with the power source 210. In this case, for example, the turbines can be positioned around the duct 106, with one or more turbines being centrally located so that the outer turbines surround the centrally located turbine. Regardless of the configuration, the turbine of the energy harvesting system 146 advantageously decreases the flow rate of fluid through the duct 106 (advantageous to greenhouse or living wall/floor area) while simultaneously capturing usable energy.

In some embodiments, the energy harvesting system 146 can include the vibration powered generator 216, which can be in electrical communication with the power source 210. The vibration powered generator 216 can be coupled to the duct 106, and in particular, can be coupled to the section 120 of the duct 106. In some cases, the vibration powered generator 216 can be coupled to the fan 140 or a portion of the duct 106 that includes the fan 140. In addition, the vibration powered generator 216 can be coupled to a portion of the duct 106 that includes the turbine 212 (or the turbine 214). In this way, with the vibration powered generator 216 closer to the moving components (e.g., the fan 140, other exhaust fans, etc.) of the exhaust hood system 100, the vibration powered generator 216 can be exposed to move vibratory motion for conversion into electrical energy. In some cases, the vibration powered generator 216 can include a piezoelectric material.

In some embodiments, the energy harvesting system 146 can include the heat exchanger 218. In some cases, the heat exchanger 218 can be in thermal communication with the cooling coil 190 to draw heat away from the liquid that flows through the coiling coil 190. In some cases, heat generated from the cooling coil 190 can be directed to hot water located within the structure 108, for example, the hot water system of the building. In other cases, the heat can be directed to a thermoelectric device, which can be in electrical communication with the power source 210.

In some embodiments, the energy harvesting system 146 can include the thermoelectric generator 220. The thermoelectric generator 220 can be in electrical communication with the power source 210, and can convert heat from the dirty heated air 112 into electrical energy. In this way, the dirty heated air 112 is further cooled, while simultaneously producing usable electrical energy. The thermoelectric generator 220 can be positioned proximal to the intake 102 (e.g., closest to the hottest air of the duct 106), and in particular, can be situated outside the duct 106, at the section 116 of the duct 106. The thermoelectric generator 220 can define a generating surface 222. The energy generating surface 222 can extend along the entire (or a partial) surface of the duct 106, at the portion 122 of the duct 106. In addition, the energy generating surface 222 can extend upwardly to cover a surface of the curved portion 124 of the duct 106. In some cases, the energy generating surface 222 (and the thermoelectric generator 220) can be situated outside of the duct 106 and in thermal communication with the duct 106 (e.g., at the particular portion). In this way, the thermoelectric generator 220 is shielded from the overly high temperatures provided by the dirty heated air 112 (e.g., because the thermoelectric generator 220 is close to the dirty heated air 112 that is positioned close to the heat source 110), and the thermoelectric generator 220 is shielded from oils and grease from the dirty heated air 112. In some embodiments, the energy generating surface 222 can be coupled to an exterior surface of the duct 106 at the section 116. In some cases, a heat sink can be coupled to the duct 106 at the section 116 (e.g., coupled to an exterior surface of the duct 106), and the energy generating surface 222 of the thermoelectric generator 220 can be coupled to and can contact the heat sink.

In some embodiments, the exhaust hood system 100 can include heat sinks 224, 226, that can be coupled to each other and can be in thermal communication with the duct 106 (E.g., at the section 116) and thus the thermoelectric generator 220. For example, as shown in FIG. 1, the heat sink 226 can be coupled to and can be in thermal communication with the duct 106 and the heat sink 224 so that the heat sink 224 is positioned between opposing sides of the duct 106 (e.g., centrally located within the duct 106). For example, the heat sink 224 can be coaxially positioned with the duct 106, and can have a longitudinal axis that extends along a longitudinal axis of the section 116 of the duct 106. In this way, the increase in surface area provided by the heat sink 224 can further cool the dirty heated air 112, while simultaneously increasing the energy generation ability of the thermoelectric generator 220. The heat sinks 224, 226 can have various shapes (e.g., a sphere, a rectangular prism, a cylinder, etc.), and can be shaped differently from each other. As illustrated in FIG. 1, the heat sink 224 can be a rectangular prism with curved edges, while the heat sink 226 can be a cylinder. In some configurations, such as when the dirty heated air 112 is not too hot for the thermoelectric generator 220, the thermoelectric generator 220 can be positioned within the duct 106 (e.g., at the section 116) with the energy generating surface 222 either facing the duct 106, or facing away from the duct 106 (e.g., facing the flow path of the duct 106).

In some embodiments, the pump 174 can switch between (e.g., via changing a valve position) pumping from the drain 136 and to the filter 134, and pumping from the reservoir 206 and to the filter 134 (and vice versa). In some configurations, a valve can be positioned in fluid communication with either of the reservoirs 176, 206, and a fluid source so that additional liquid can flow from the fluid source and into the respective reservoir.

In some embodiments, the exhaust hood system 100 can include a safety drain that is in fluid communication with liquid emitted from the filter 134. For example, the safety drain can drain water from the filter 134. In some cases, this safety drain can be in fluid communication with the drain 136 so that in the event the drain 136 is plugged, liquid can be evacuated out through the safety drain (e.g., so that the liquid does not backflow to the cooking surface). In some embodiments, a diverter can be used over the fryers and the cooking surface, as water spilling into either poses a hazardous situation. In some configurations, a water level sensor (e.g., a float valve, a photo-eye, etc.) that senses a predetermined water level can be used to allow or divert water away from the cooking surface (e.g., deep fryers). For example, a computing device can sense a water level, and can cause a gate to divert liquid flow away from the heat source 110, based on the water level exceeding a threshold. In some cases, the water level sensor can be positioned between the filter 134 and the intake 102, and can be positioned within a lip of the hood 114. In some embodiments, the computing device can cause the shut-off valve 196 to close, and the pumps 174, 188 to turn off.

In some embodiments, a computing device (e.g., a processor) can be in communication with some or all of the components of the exhaust hood system 100. For example, the computing device can be in communication with the fan 140, the pumps 188, 174, the valves 170, 192, 194, etc. In this way, the computing device can control aspects of each of these components (e.g., opening and closing the valve).

The present disclosure has described one or more preferred embodiments, and it should be appreciated that many equivalents, alternatives, variations, and modifications, aside from those expressly stated, are possible and within the scope of the invention.

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

In some embodiments, aspects of the disclosure, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the disclosure, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," etc. are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The following detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Various features and advantages of the disclosure are set forth in the following claims.

The invention claimed is:
1. An exhaust hood system comprising:
an intake located within a building;
an output located outside of the building;
a duct connected between the intake and the output, the duct fluidly connecting the intake and the output together, the duct having
a vertical intake portion positioned within the building;
a vertical exhaust portion positioned outside of the building; and
a horizontal portion positioned between the vertical intake portion and the vertical exhaust portion;
a filter positioned within the duct between the intake and the output, the filter emitting a liquid within a portion of the duct;
a drain in fluid communication with the filter;
a drain line in fluid communication with the drain;
a valve in fluid communication with the drain line;
a recirculation line in fluid communication with the valve, the recirculation line in fluid communication with the filter;
a pump in fluid communication with the valve and the recirculation line, the pump directing fluid from the valve, through the recirculation line, and to the filter to emit the liquid;
an energy harvesting system including
a power source;
an electric turbine in electrical communication with the power source; and
a thermoelectric generator in electrical communication with the power source; and
a chamber in fluid communication with the drain, the chamber comprising a photosynthetic agent or a fungal agent,
wherein a flow path is defined from the intake and to the output,
wherein a portion of the vertical exhaust portion of the duct is coupled to the chamber, and
wherein the cross-section of the portion of the vertical exhaust portion of the duct that is coupled to the chamber increases along the flow path, and
wherein the cross-section of the chamber is larger than a cross-section of the vertical intake portion of the duct.
2. The exhaust hood system of claim 1, further comprising a fan being configured to drive fluid flow along the flow path, wherein the electric turbine is positioned outside of the building and within the vertical exhaust portion of the duct, and wherein the thermoelectric generator is positioned inside of the building and within at least one of the vertical intake portion or the horizontal portion of the duct.

\* \* \* \* \*